(12) United States Patent
Turon et al.

(10) Patent No.: US 9,279,683 B2
(45) Date of Patent: Mar. 8, 2016

(54) REAL-TIME AIRCRAFT STATUS DETECTION SYSTEM AND METHOD

(71) Applicant: Moog Inc., East Aurora, NY (US)

(72) Inventors: Martin A. Turon, Berkeley, CA (US); Darren S. Liccardo, Sunnyvale, CA (US)

(73) Assignee: Moog Inc., East Aurora, NY (US)

( * ) Notice: Subject to any disclaimer, the term of this patent is extended or adjusted under 35 U.S.C. 154(b) by 6 days.

(21) Appl. No.: 14/382,182

(22) PCT Filed: Mar. 2, 2013

(86) PCT No.: PCT/US2013/028780
§ 371 (c)(1),
(2) Date: Aug. 29, 2014

(87) PCT Pub. No.: WO2013/131072
PCT Pub. Date: Sep. 6, 2013

(65) Prior Publication Data
US 2015/0027226 A1    Jan. 29, 2015

Related U.S. Application Data

(60) Provisional application No. 61/606,364, filed on Mar. 2, 2012.

(51) Int. Cl.
*G01C 19/56*    (2012.01)
*G01C 19/00*    (2013.01)
*H04Q 9/00*    (2006.01)
*B64D 43/00*    (2006.01)

(52) U.S. Cl.
CPC .............. *G01C 19/56* (2013.01); *B64D 43/00* (2013.01); *H04Q 9/00* (2013.01); *H04Q 2209/00* (2013.01)

(58) Field of Classification Search
CPC ............................... G01C 19/56; G01C 19/00
USPC ..................................................... 73/504.04
See application file for complete search history.

(56) References Cited

U.S. PATENT DOCUMENTS

| | | |
|---|---|---|
| 6,281,797 B1 | 8/2001 | Forster et al. |
| 6,651,002 B1 | 11/2003 | Morgan |
| 7,187,278 B2 | 3/2007 | Biffar |
| 7,212,829 B1 | 5/2007 | Lau et al. |

(Continued)

OTHER PUBLICATIONS

The International Search Report (ISR) and Written Opinion of the International Searching Authority for International Application No. PCT/US2013/028780; Publication No. WO/2013/131072; dated May 1, 2015.

(Continued)

*Primary Examiner* — Lisa Caputo
*Assistant Examiner* — Jamel Williams
(74) *Attorney, Agent, or Firm* — Phillips Lytle LLP

(57) ABSTRACT

A low power method for determining whether a cargo destined for air transport is in a flying state having the steps of: providing a housing for attachment to a cargo the housing having: an accelerometer for detecting a linear acceleration, a gyroscope for detecting an angular rate, a controller measuring a linear acceleration with the accelerometer, measuring an angular rate with the gyroscope, providing the measured linear acceleration and angular rate to the controller, and generating a flight status output signal indicating whether the housing is in a flying state as a function of the linear acceleration signal and angular rate signal.

39 Claims, 5 Drawing Sheets

(56) References Cited

U.S. PATENT DOCUMENTS

| | | |
|---|---|---|
| 7,253,731 B2 | 8/2007 | Joao |
| 7,627,666 B1 | 12/2009 | Degiulio et al. |
| 7,791,455 B1 | 9/2010 | MacLean, III et al. |
| 2009/0315704 A1* | 12/2009 | Rosing .................. G06Q 10/08 340/539.13 |
| 2011/0093250 A1 | 4/2011 | Lin |
| 2011/0095940 A1 | 4/2011 | Breed |
| 2014/0184804 A1* | 7/2014 | Lee .......................... G01S 5/00 348/159 |
| 2014/0235188 A1* | 8/2014 | Lee .................... H01M 10/465 455/127.5 |

OTHER PUBLICATIONS

Onasset Intelligence, Inc; Enabling Worldwide Package Delivery with M2M; Whitepaper, 2009.

The (IB/373) International Preliminary Report on Patentability Chapter I for International Patent Application No. PCT/US2013/028780; Publication No. WO 2013/131072 A1; dated May 12, 2015.

* cited by examiner

FIG. 4 – VERIFY_STATE processing

REAL-TIME AIRCRAFT STATUS DETECTION SYSTEM AND METHOD

CROSS-REFERENCE TO RELATED APPLICATIONS

This application claims priority to U.S. provisional patent application No. 61/606,364 which was filed on Mar. 2, 2012, which is hereby incorporated by reference in its entirety.

TECHNICAL FIELD

The technical field relates to aircraft status detection, including aircraft takeoff, landing, flying, and aircraft proximity detection.

BACKGROUND ART

Aircraft flight status detectors are generally known. For example, U.S. Pat. No. 7,791,455 entitled "Method and Apparatus for Autonomous Detection of a Given Location or Situation" is directed to system for detecting the presence of operational aircraft through detecting the presence of a predetermined signal, the arrival at a given location, and a change in air pressure.

BRIEF SUMMARY OF THE INVENTION

With parenthetical reference to the corresponding parts, portions or surfaces of the disclosed embodiment, merely for the purpose of illustration and not by way of limitation, provided is a low power method for determining whether a cargo (114) destined for air transport is in a flying state having the steps of: providing a housing (111) for attachment to a cargo the housing having: an accelerometer (117) for detecting a linear acceleration; a gyroscope (118) for detecting an angular rate; a controller (110); measuring a linear acceleration with the accelerometer; measuring an angular rate with the gyroscope; providing the measured linear acceleration and angular rate to the controller; and generating a flight status output signal (115) indicating whether the housing is in a flying state as a function of the linear acceleration signal and angular rate signal.

The method may further have the step of shutting off a radio as a function of the flight status output signal. The measured linear acceleration hay have a three independent axis linear acceleration signal. The measured angular rate may have a three independent axis rotation rate signal. The measured angular rate signal may have a sampling rate of about 25 Hz.

The flight status output signal may have an in-flight status state and an on-the-ground status state. The in-flight status state may have a verify-takeoff status state. The method may further have the step of providing a radio turn off signal when the flight status output signal may have an in-flight status. The function may be a state machine algorithm.

The method may further have the step of powering the gyroscope as a function of the flight status output signal. The gyroscope may be powered off when the flight status output signal may have an on-the-ground status state. The gyroscope may be powered on when the flight status output signal may have a verify-takeoff status state. The function may have the steps of: filtering the measured linear acceleration to produce a filtered linear acceleration; filtering the measured angular rate to produce a filtered angular rate; and changing a state as a function of the filtered linear acceleration and filtered angular rate.

The step of generating a flight status output signal may have the step of removing a gravitational component of the measured linear acceleration. The step of removing a gravitational component may have a high pass filter. The high pass filter may have a cutoff frequency of about 0.01 Hz. The method may further have the step of saving the removed gravitational component.

The step of generating a flight status output signal further may have the step of detecting a linear acceleration characteristic of an aircraft takeoff. The linear acceleration characteristic of takeoff is an acceleration signal with a frequency between 0.01 Hz and 0.1 Hz and a magnitude of about 0.2 g. The linear acceleration characteristic of a takeoff further may have an acceleration signal which may have a magnitude between about 0.15 g and 0.5 g maintained for a duration of about two seconds. The step of detecting a linear acceleration characteristic of an aircraft takeoff further may have a step of low pass filtering.

The method may further have the step of saving a takeoff acceleration of the linear acceleration signal when the linear acceleration characteristic of an aircraft takeoff is detected. The saved takeoff acceleration may have a windowed average. The step of generating a flight status output signal further may have the step of changing from an on-the-ground state to a verify-takeoff state when the linear acceleration characteristic of an aircraft takeoff is detected. The step of saving a gravitational acceleration component from the linear acceleration signal.

The gravitational acceleration is saved from a time period before a transition to a verify-takeoff state. The time period is about 7 seconds. The step of generating a flight status output signal further may have the step of detecting an angular rate characteristic of an aircraft takeoff. The angular rate characteristic of an aircraft takeoff is an angular rate in which an x-axis angular rate, a y-axis angular rate, and a z-axis angular rate are all less than an angular rate limit threshold.

The measured angular rate is transformed through a rotation, the rotation configured and arranged to reorient the measured angular rate into a yaw rate, a roll rate, and a pitch rate. The rotation is a cross product of the saved gravitational acceleration and the saved takeoff acceleration. The method may further have the step of integrating the angular rate with respect to time to produce a pitch angle displacement, a yaw angle displacement, and a roll angle displacement.

The method may further have the step of setting the flight status output signal to an on-the-ground state when the pitch angle displacement, yaw angle displacement, or roll angle displacement are greater than an angle displacement threshold.

The method may further have the steps of: providing a pressure sensor. The method may further have the step of detecting when the pressure sensor may have a pressure decrease rate less than a takeoff pressure decrease threshold. The method may further have the step of detecting when the pressure sensor may have a pressure increase rate greater than a landing pressure increase threshold.

In another aspect, provided is a system for detecting an aircraft flight status having: a housing having: an accelerometer for detecting a linear acceleration and having a linear acceleration output signal; a gyroscope for detecting an angular rate and having an angular rate output signal; and a controller configured and arranged to produce a flight status output signal as a function of the linear acceleration output signal and the angular rate output signal, the flight status output signal having an in-flight state and another state.

The controller is further configured to shut off a radio as a function of the flight status output signal. The linear acceleration output signal may have a three independent axis linear acceleration signal. The angular rate output signal may have a three independent axis rotation rate signal. The angular rate output signal may have a sampling rate of about 25 Hz. The flight status output signal may have an on-the-ground status state. The in-flight status state may have a verify-takeoff status state.

The controller may be configured and arranged turn off the radio when the flight status output signal may have an in-flight status. The function is a state machine algorithm. The controller is configured and arranged to power the gyroscope as a function of the flight status output signal. The controller is configured and arranged to power off the gyroscope when the flight status output signal may have an on-the-ground status state.

The controller is configured and arranged to power on the gyroscope when the flight status output signal may have a verify-takeoff status state. The function may have a filter configured and arranged to produce a filtered linear acceleration, and a filter configured and arranged to produce a filtered angular rate. The controller is configured and arranged to remove a gravitational component of the linear acceleration output signal. The system may further have a high pass filter configured and arranged to remove the gravitational component from the linear acceleration output signal. The high pass filter may have a cutoff frequency of about 0.01 Hz.

The controller may be configured and arranged to save the removed gravitational component. The controller may be configured and arranged to detect a linear acceleration characteristic of an aircraft takeoff. The linear acceleration characteristic of takeoff is an acceleration signal with a frequency between 0.01 Hz and 0.1 Hz and a magnitude of about 0.2 g. The linear acceleration characteristic of a takeoff further may have an acceleration signal which may have a magnitude between about 0.15 g and 0.5 g maintained for a duration of about two seconds.

The system may further have a low pass filter configured and arranged to filter the linear acceleration output for detection of an acceleration characteristic of an aircraft takeoff. The controller may be configured and arranged to save the acceleration output signal when a linear acceleration characteristic of an aircraft is detected. The saved acceleration output signal may have a windowed average.

The controller may be configured and arranged to change the flight status output signal from an on-the-ground state to a verify-takeoff state when the linear acceleration characteristic of an aircraft takeoff may be detected. The controller may be configured and arranged to save a gravitational acceleration component from the linear acceleration signal.

The gravitational acceleration may be saved from a time period before a transition to a verify-takeoff state. The time period may be about 7 seconds. The controller may be configured and arranged to detect an angular rate characteristic of an aircraft takeoff.

The angular rate characteristic of an aircraft takeoff may be an angular rate in which an x-axis angular rate, a y-axis angular rate, and a z-axis angular rate are all less than an angular rate limit threshold. The system may further have a rotation transformer configured and arranged to transformed the angular rate output signal through a rotation, the rotation configured and arranged to reorient the measured angular rate into a yaw rate, a roll rate, and a pitch rate. The rotation may be a cross product of the saved gravitational acceleration and the saved takeoff acceleration.

The system may further have an integrator configured and arranged to integrate the angular rate with respect to time to produce a pitch angle displacement, a yaw angle displacement, and a roll angle displacement. The controller may be configured and arranged to set the flight status output signal to an on-the-ground state when the pitch angle displacement, yaw angle displacement, or roll angle displacement are greater than an angle displacement threshold.

The system may further have a pressure sensor. The controller may be configured and arranged to detect when the pressure sensor may have a pressure decrease rate less than a takeoff pressure decrease threshold. The controller may be configured and arranged to detect when the pressure sensor may have a pressure increase rate greater than a landing pressure increase threshold.

In another aspect, provided is a method of determining an aircraft flight status state among a set of flight status states having the steps of: providing a housing for attachment to a package the housing having: an accelerometer for detecting a linear acceleration and having an acceleration output signal; a gyroscope for detecting a rotational acceleration and having an angular acceleration output signal; receiving an acceleration output signal from the accelerometer; receiving an angular rate output signal from the gyroscope; determining the aircraft flight status state as a function of the acceleration output signal and the angular rate output signal, the set of flight status states having an in-flight state and another state.

DESCRIPTION OF THE PREFERRED EMBODIMENTS

Figure 1:
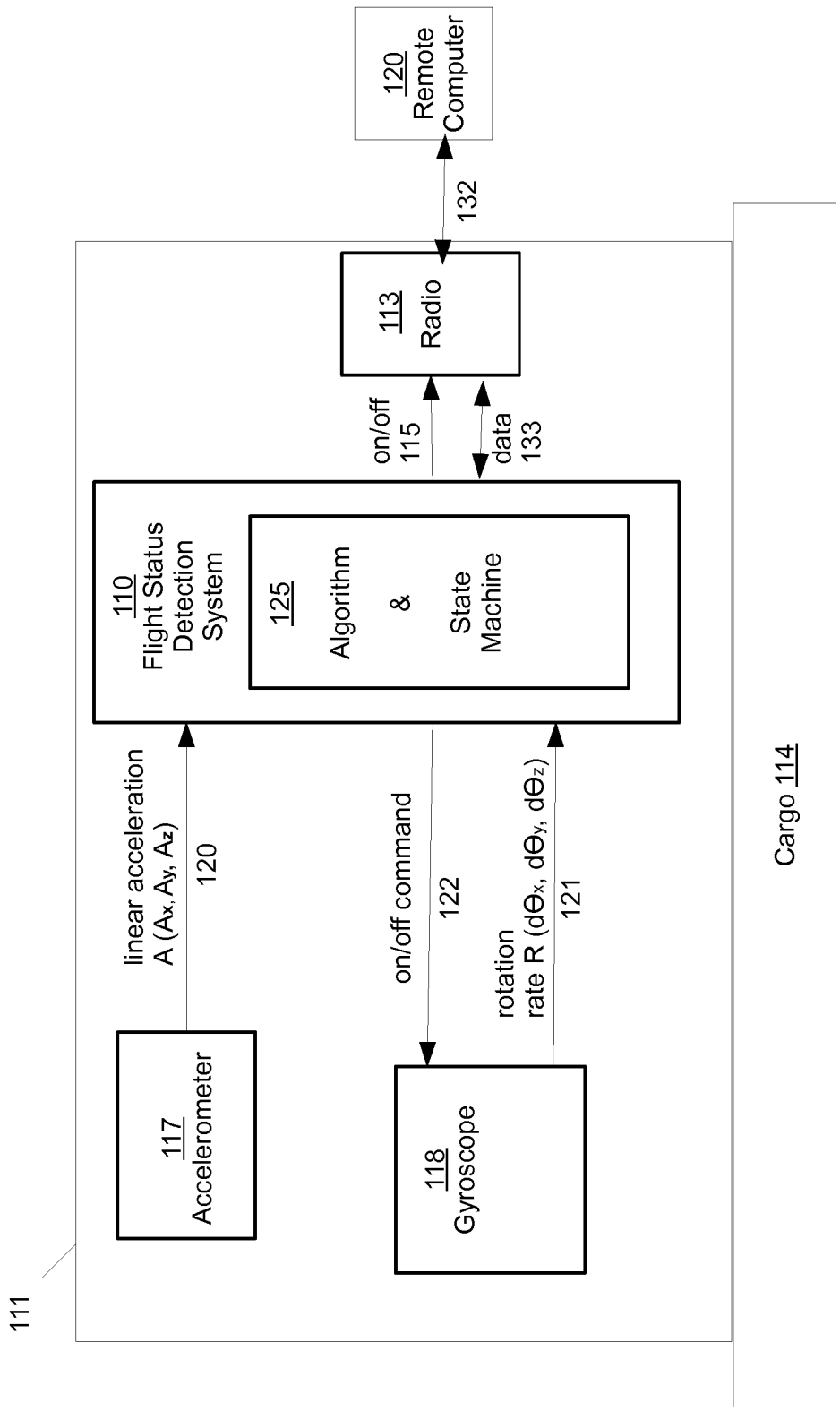
FIG. 1 is an object diagram of a first embodiment aircraft flight status detection system incorporated into a cargo tracking device.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The disclosed flight status detection system is a system for detecting aircraft events, such as takeoff and landing events, through the use of accelerometers, gyroscopes, and/or other sensors. The flight status detection system can be used together with a device having a cellular radio in order to turn off the cellular radio during a takeoff event and turn back on upon landing.

For example, the flight status detection system can be used within a flight cargo tracking device having a cellular data modem. While the cargo tracking device is on the ground, periodic tracking reports are sent over the cellular modem to a remote server. When the flight status detection system detects that the tracking device is on an aircraft that is taking off, the cellular modem of the cargo tracking system is turned off. This will prevent the cellular modem radio from interfering with aircraft radios and sensors. Such a system is useful in order to comply with flight safety regulations that require that radios be shut off prior to takeoff. When the flight status detection system detects that the aircraft has landed, the cellular modem is turned back on, allowing the cargo tracking device to resume sending out periodic tracking reports.

Referring now to the figures, and more particularly to FIG. 1, disclosed is flight status detection system 110 configured and arranged within cargo tracking and reporting module 111. Tracking module 111 is typically affixed to or placed within a cargo container, such as cargo container 114. Tracking module 111 gathers and transmits transportation data 132 to remote computer 120 while cargo container 114 is transported. The major components of tracking module 111 are flight status detection system 110, accelerometer 117, gyroscope 118, and radio 113.

Accelerometer 117 is a low power three axis MEMS linear accelerometer such as an LIS3DH from STMicroelectronics of Geneva Switzerland. Accelerometer 117 provides three axis linear acceleration data A (Ax, Ay, Az) 120 to flight status detection system 110. Gyroscope 118 is a low power MEMS gyroscope such as a CMR3000, from VTI Technologies (now Murata Manufacturing Oy of Nagaokakyo, Kyoto). Gyroscope 118 is turned on and off through on/off command 122 from system 110. Gyroscope 118 provides three axis rotation rate data R (d$\Theta$x, d$\Theta$y, d$\Theta$z) 121 to system 110.

System 110 is implemented on a microcontroller having its own flash memory, such as an Atmel AVR Atmega328. System 110 contains software algorithm and state machine 125. System 110 provides on/off command 115 to radio 113. System 110 is also connected to radio 113 through data transfer line 133. with Radio 113 is a radio such as a GE 865-QUAD GSM/GPRS from Telit Wireless Solutions, Trieste, Italy. Radio 113 is capable of transmitting and receiving data to/from a remote location such as a cellular tower connected to the Internet over wireless link 132.

Figure 2:
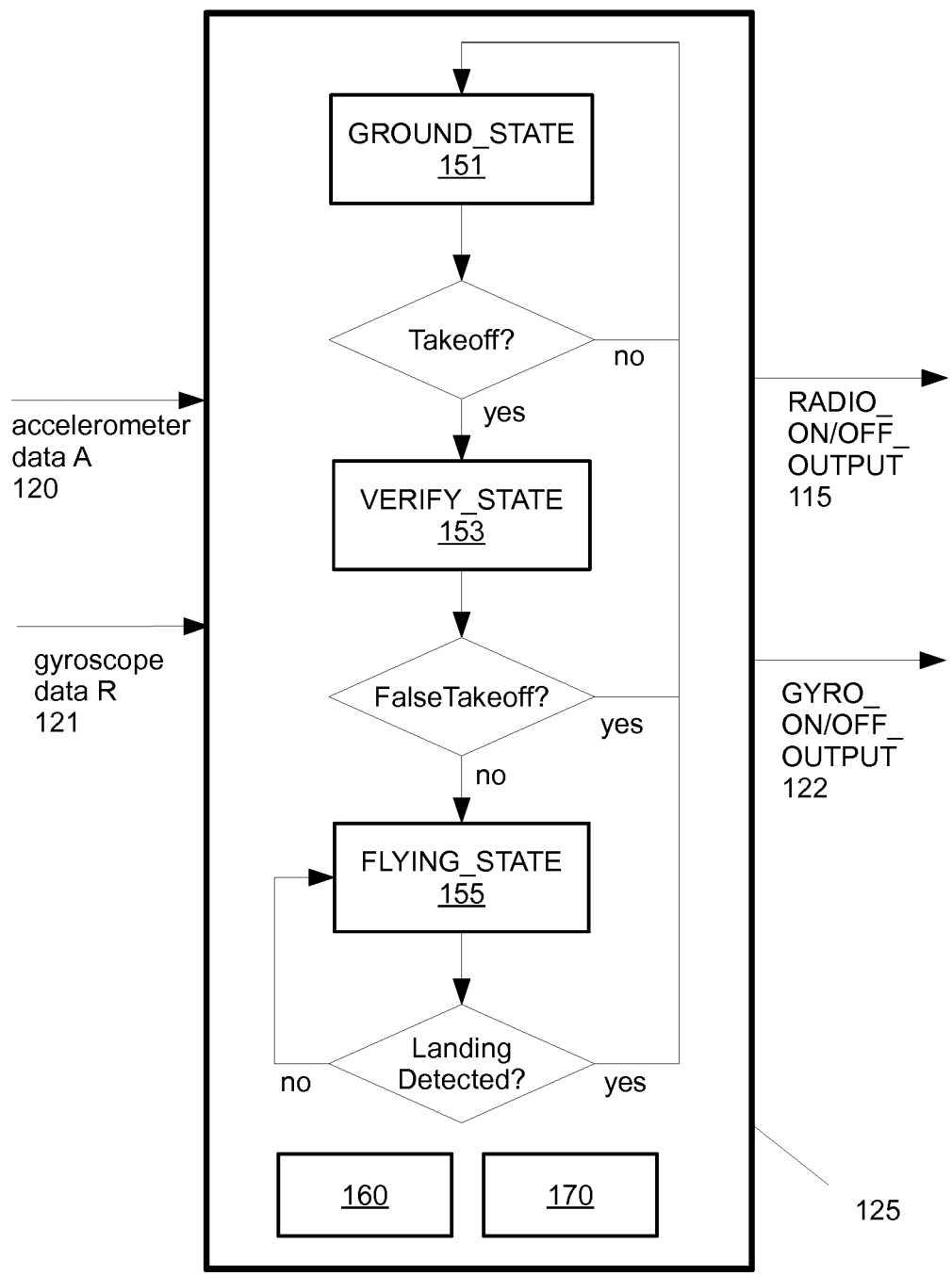
FIG. 2 is an algorithm and state diagram of the flight status detection system shown in FIG. 1.

FIG. 2 is a state machine diagram of algorithm 125 running in flight status detection system 110. Algorithm 125 generally receives inputs of accelerometer data (A) 120 and gyroscope data (R) 121; and has outputs GYRO_ON/OFF_OUTPUT 122 and RADIO_ON/OFF_OUTPUT 115. Algorithm 125 contains a state machine which generally has three separate states including: GROUND_STATE 151, VERIFY_STATE 153, and FLYING_STATE 155. A series of variables 160 and parameter constants 170 are used by algorithm 125.

Accelerometer data 120 is a stream of time sampled acceleration vector values having an acceleration sample for each dimension (Ax, Ay, Az). Acceleration data is sampled at a rate of 20 Hz. Based upon power and accuracy tradeoffs, acceleration data may be sampled at much higher rates, such as up to 10 kHz. Note that there is no guarantee that accelerometer 117 has any of its axes (x, y, z) aligned with the direction of gravity when cargo 114 is stowed on an aircraft, truck, or warehouse. In other words, cargo 114 may be a box oriented on an angle such that neither of Ax, Ay, nor Az give a measurement along a world z-axis (an axis aligned with the direction of gravity). Gyroscope data 121 is also a series of three dimensional vector values (Rx, Ry, Rz). Each of Rx, Ry, and Rz represent the rotation rate along three independent axes. Gyroscope data is also sampled at a rate of 20 Hz, however, higher sampling rates may be used when power is not a high concern. Alternative gyroscopes may be used which provide angular acceleration, jerk, velocity, and/or position, or any combination thereof.

The first algorithm state, GROUND_STATE 151 is both a starting state as well as a state corresponding to a flight status of when system 110 believes the system is not on an aircraft taking off or flying. In GROUND_STATE 151, GYRO_ON/OFF_OUTPUT 122 is set to OFF (i.e. low voltage, or FALSE) causing gyroscope 118 to be off. Gyroscope 118 will thus not require operating power in this state. Also in GROUND_STATE 151, RADIO_ON/OFF_OUTPUT 115 is set to ON (i.e. low voltage HIGH, or TRUE). Therefore, in this state, radio 113 is able to transmit data 132.

In GROUND_STATE 151, accelerometer data 120 is read and analyzed. If an accelerometer data sequence that is characteristic of a potential aircraft takeoff is identified, recent accelerometer data is saved, and the algorithm state machine enters VERIFY_STATE 153.

Once in VERIFY_STATE 153, GYRO_ON/OFF_OUTPUT 122 is transitioned from OFF to ON (low to high voltage, FALSE to TRUE). This causes gyroscope 118 to turn on and start generating gyroscope data R 121. In VERIFY_STATE 153, current gyroscope data R 121 and accelerometer data A, 120 is analyzed and compared to the accelerometer data saved at the potential takeoff. Several tests are done with the gyroscope data and accelerometer data over time. If the analysis indicates that a takeoff event has not occurred, the state is returned to GROUND_STATE. However, if the analysis indicates that a takeoff has indeed occurred, the state machine enters FLYING_STATE 155.

In FLYING_STATE 155 both RADIO_ON/OFF_OUTPUT 115 and GYRO_ON/OFF_OUTPUT 122 are set to OFF (voltage low, FALSE). Thus, in this state, neither gyroscope 118 nor radio 113 consume power, and radio signals from radio 113 which could potentially interfere with flight instruments are prevented. Accelerometer data 120 is still sampled and is analyzed for a pattern that is characteristic of an aircraft landing. If an accelerometer pattern characteristic of an aircraft landing is sensed, the state machine reenters GROUND_STATE 151.

Upon reentering GROUND_STATE 151 the algorithm sets RADIO_ON/OFF_OUTPUT 115 to ON (voltage high, TRUE). The algorithm will then continue to process data and step through the state machine as described above.

Figure 3:
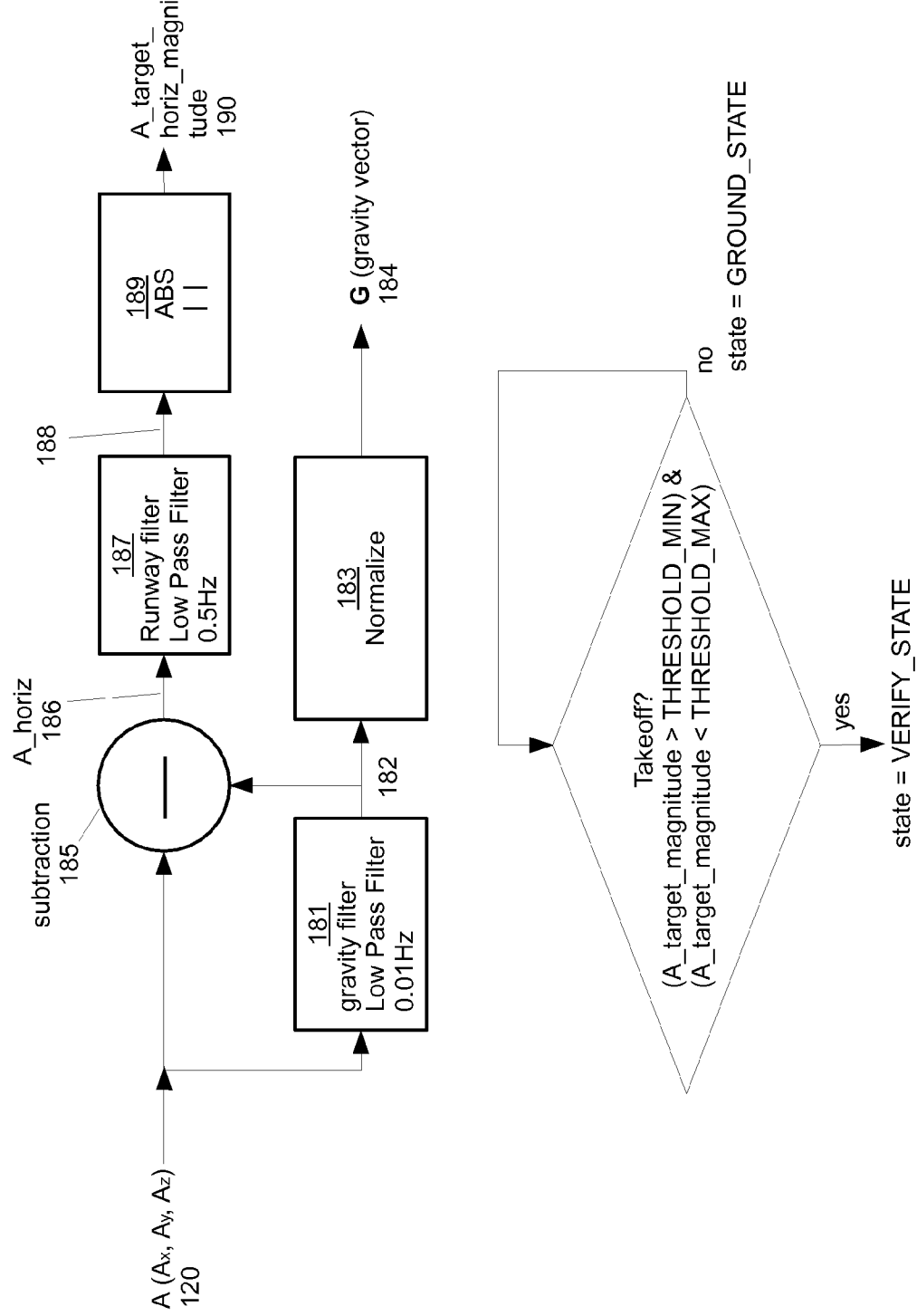
FIG. 3. is a flow diagram of the on-the-ground state processing in the system shown in FIG. 1.

FIG. 3 is a datapath diagram of the processing done in GROUND_STATE 151. In GROUND_STATE 151, RADIO_ON/OFF_OUTPUT 115 is ON allowing radio 113 to function, and GYRO_ON/OFF_OUTPUT 122 is OFF, preventing gyroscope 118 from using power. The algorithmic processing in GROUND_STATE uses the stream of accelerometer data 120 to make the decision of whether a candidate takeoff signature has been sensed. Accelerometer data 120 is first filtered by gravity filter 181 to produce gravity filter output 182. Gravity filter 131 is a first order low pass Butterworth filter with a cutoff frequency of 0.01 Hz. Since cargo 114 is typically not rotated slowly over a one hundred second interval, the filtered accelerometer value 182 coming out of gravity filter 131 is typically a good representation of the linear acceleration experienced by accelerometer 117 due to gravity. In other words, the resulting vector 182 is likely to have an orientation pointing straight up relative to the Earth. Vector 182 is passed through normalization block 183 which scales the magnitude of vector 182 to unity length to produce gravity vector G 184. Gravity vector G 184 is an important variable which is used in multiple functions of algorithm 125.

Referring back to gravity filter output 182, output 182 is subtracted 185 from original accelerometer sample 120 to produce vector A_horiz 186. A_horiz 186 is a vector which is equivalent to the original acceleration A 120 but with the gravity vector component removed. In other words, A_horiz represents the horizontal, or perpendicular to gravity (tangent to Earth) component of acceleration A 120. For example, if cargo 114 is accelerated along a runway, A_horiz 186 will generally represent the component of acceleration in the direction along the runway.

A_horiz 186 is then passed through runway filter 187 to produce output 188. Runway filter 187 is a first order Butterworth low pass filter with a frequency cutoff of 0.5 Hz. Runway filter 187 generally removes high frequency accelerations which are characteristic of bumps on a road, rapid automotive accelerations due to speeding up, braking, or turning, and/or cargo handling shocks to yield an acceleration vector having only the targeted frequencies. Output 188 is then passed through magnitude block 189 to produce A_target_horiz_magnitude 190, which is merely the vector length (magnitude) of output 188.

A_target_horiz_magnitude 190 represents the magnitude of the original acceleration after the gravity component is removed and the unwanted high frequency components are removed. In other words, A_target_horiz_magnitude 190 represents the magnitude of the horizontal acceleration in the targeted frequency range. The calculations of A_target_horiz_magnitude and G are accurate regardless of the orientation that cargo 114 is in. If A_target_horiz_magnitude is a value that is typical of an aircraft takeoff, the state is changed to VERIFY_STATE 153. More specifically, if A_target_horiz_magnitude is greater than threshold A_THRESHOLD_MIN 171 and less than threshold A_THRESHOLD_MAX 172, then the state machine will enter VERIFY_STATE 153. Before transitioning to VERIFY_STATE 153, some variables are stored for later use. Gravity Vector G 184, is stored to G_takeoff 161, and A_horiz 186 is stored in A_horiz_takeoff 162. Instead of saving the most recent values of G 184 and A_horiz 186, it is beneficial to store the values of G 184 and A_horiz 186 from 2 to 8 seconds prior to the detected takeoff event.

In VERIFY_STATE 153, gyroscope 118 is turned on by setting GYRO_ON/OFF_OUTPUT 122 to ON. Generally, RADIO_ON/OFF_OUTPUT 115 is not changed and remains ON, however, it may be beneficial in some implementations to turn RADIO_ON/OFF_OUTPUT OFF 115 in the VERIFY_STATE 153. The A_target_magnitude 190 is calculated in VERIFY_STATE 153 just as it was in GROUND_STATE 151. If at any time in VERIFY_STATE 153 A_target_magnitude 190 drops below A_THRESHOLD_MIN 171 or rises above A_THRESHOLD_MAX 172, the state is returned to GROUND_STATE 151. In other words, if the magnitude of the horizontal acceleration in the targeted frequency range is either too high or too low to be characteristic of an aircraft takeoff, the algorithm determines that a takeoff event has not occurred and returns the state back to GROUND_STATE 151.

The processing of accelerometer data 120 and gyroscope data 121 in VERIFY_STATE 153 includes removing offset biases, filtering the data, and rotating the resulting vector data through a rotation matrix in order to align the vector axes with the perceived direction of gravity and airplane forward acceleration. The linear acceleration and rotation rate signals are then each separately integrated to yield linear velocity and angle data. The acceleration, velocity, rotation rate, rotation angle data are then checked to see if they are in acceptable ranges of data which is characteristic of an aircraft takeoff.

Figure 4:
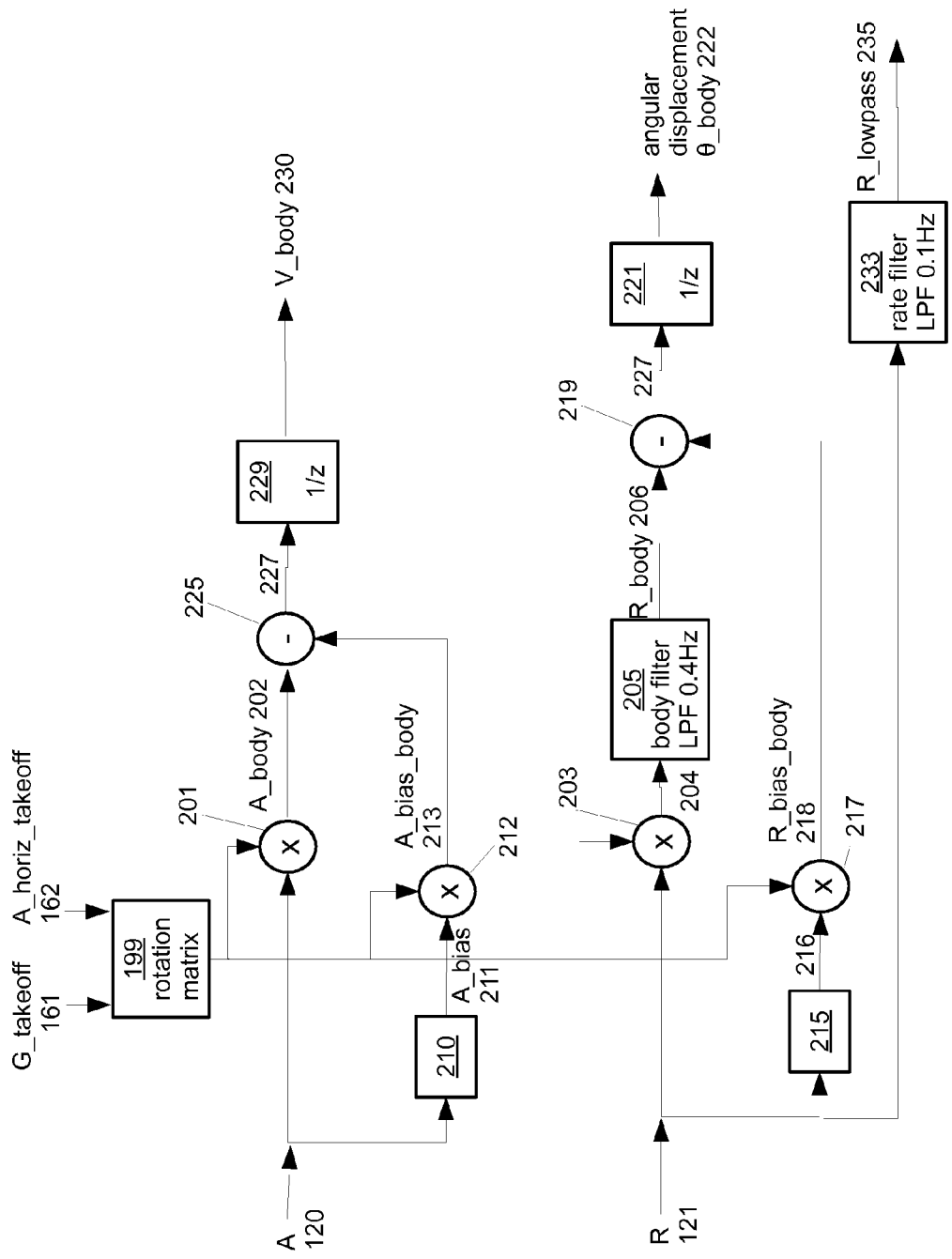
FIG. 4. is a flow diagram of the verify-takeoff state processing in the system shown in FIG. 1.

FIG. 4 shows the processing steps taken by algorithm 125 in VERIFY_STATE 153. Vector acceleration data A 120 and rotation rate data R 121 are received as well as the saved gravity vector G_takeoff 161 and horizontal acceleration A_horiz_takeoff 162 from GROUND_STATE 151. First, rotation matrix 199 is constructed from the saved G_takeoff 161 and A_horiz_takeoff 162. More specifically, rotation matrix 199 is constructed by concatenating G_takeoff 161, with normalized horizontal acceleration A_horiz_takeoff, and the vector cross product of G_takeoff 161 and normalized A_horiz_takeoff. In pseudocode the rotation matrix is expressed as:

```
Rot. matrix = [G_takeoff;
               A_horiz_takeoff / |A_horiz_takeoff|;
               G_takeoff × (A_horiz_takeoff / |A_horiz_takeoff|) ]
```

By multiplying an acceleration vector by rotation matrix 199, the acceleration vector is reoriented such that the z axis is now aligned with gravity vector G_takeoff 161, and the y-axis is aligned in the direction of the horizontal acceleration vector A_horiz_takeoff 162. For example, as shown in FIG. 4, acceleration data A 120 is vector multiplied 201 by rotation matrix 199 to produce vector Abody 202. The z-axis vector component of Abody 202, Abody_z, represents acceleration in the direction of the perceived real world gravity. Similarly, Abody_y represents the acceleration or braking of the aircraft in the direction along the runway. In summary, rotation matrix 199 is used to account for the fact that cargo 114 may be secured in any orientation on a vehicle and the Abody vector will always be rotated such that Abody_z is in the direction of gravity, and Abody_y is in the direction of horizontal takeoff acceleration.

Similar to the processing to calculate Abody 202, rotation rate data R 121 is rotated through vector multiplication 203 with rotation matrix 199 to produce vector product 204. Vector product 204 is then passed through body filter 205 to produce Rbody 206. Body filter 205 is a first order Butterworth low pass filter with a frequency cutoff of about 0.4 Hz. Rbody 206 is a low pass filtered version of R 121 in which the axes have been rotated to correspond to the perceived aircraft body frame of reference calculated from G_takeoff 161 and A_horiz_takeoff 162 as was done in calculating Abody 202. More specifically, Rbody_z represents the rotation rate about the perceived aircraft yaw axis. Similarly, Rbody_y represents the rotation rate about the perceived aircraft pitch axis, and Rbody_x represents the rotation rate about the perceived aircraft roll axis.

Averaging block 210 maintains a running sum of acceleration data 120 which is divided by the received sample count to produce vector output 211. Vector output 211 is then rotated by vector multiplication 212 with rotation matrix 199 to produce Abias_body 213. Abias_body represents the raw time averaged acceleration data rotated to be aligned with the perceived aircraft frame.

Similarly, averaging block 215 maintains a running sum of rotation rate data 121 which is divided by the count of the number of received samples to create vector product 216. Vector product 216 is then rotated 217 by rotation matrix 199 to produce Rbias_body 213. The data used to compute Abias_body 213 and Rbias_body is limited to a fixed duration lasting about five seconds.

Rbias_body 218 is subtracted 219 from Rbody 206 and integrated 221 to produce angular displacement θ_body 222. Angular displacement θ_body (θ_body_x, θ_body_y, θ_body_z), 222 is vector that represents an estimate of the angle that the perceived aircraft has rotated during the time after collection of the data for Rbias_body 218 ended. For example, θ_body_y represents the aircraft angular displacement about the pitch axis, θ_body_z represents the aircraft angular displacement about the yaw axis, and θ_body_x represents the aircraft angular displacement about the roll axis.

In order to determine the change in velocity, a similar integration is performed on the Abody signal. As shown in FIG. 4, Abias_body 213 is subtracted 225 from Abody 202 to produce vector result 227. Vector result 227 is integrated 229 to produce velocity change vector V_body 230. V_body is made up of the three components, V_body_x, V_body_y, V_body_z, each representing the change in velocity in one dimension. For example, V_body_y represents the change in velocity along the runway direction.

The rate data 121 is also passed through rate filter 233 which is a first order Butterworth low pass filter with a cutoff frequency of about 0.1 Hz. The output of rate filter 233 is R_lowpass 235.

In state VERIFY_STATE 153, a series of boundary checks are performed on the computed acceleration, velocity change, rotation rate, and angular displacement variables.

The boundary checks include a check that the absolute value of R_low_pass 235 remains<RATES_THRESHOLD 173. This is to reject times when cargo 114 is rotated too fast to be characteristic of an aircraft takeoff. Similarly, the absolute value of Abody 211 is verified to remain greater than BODY_MAC_ACCEL. Additionally, algorithm 125 verifies other parameters including:

abs(θ_body.y) < -MAX_PITCH_DOWN 175
θ_body.x > YAW_ROLL_LIMIT 176
abs(θ_body.z) > YAW_ROLL_LIMIT 177
abs(V_body.y) > YZ_MAX_V 178
abs(V_body.z) > YZ_MAX_V 178
abs(Rbody) > MAX_RATES 179
abs(Abody) > BODY_MAX_ACCEL 174

If any of the tested variables are not within acceptable range, the state will be changed back to GROUND_STATE. However, if none of the tested variables are out of range for a duration of time greater than VERIFY_DURATION and the pitch displacement θ_body.y is greater than MIN_PITCH_UP and the change in runway oriented velocity V_change.x is greater than X_MIN_V, then the state is changed to FLYING_STATE 155.

In FLYING_STATE 155 GYRO_ON/OFF_OUTPUT and RADIO_ON/OFF_OUTPUT are both made OFF. Also in FLYING_STATE 155 Abody is calculated using the same method as in VERIFY_STATE 153. A landing event is detected by sensing when Abody.y<−LANDING_THRESHOLD. When a landing event is detected the state is changed back to GROUND_STATE.

Other embodiments of flight status detection system 110 include both algorithmic modifications and the use of additional sensor data types.

In a second embodiment, FLYING_STATE processing is augmented to involve constant monitoring of expected aircraft maneuvers. These maneuver include:
a. Coordinated turns
   i. Where it is expected that a horizontal plane circular motion constraint is maintained.
b. Coupled roll and yaw rates
   i. Where it is expected that roll rate leads yaw rate into a turn, followed by constant yaw rate motion, and finally, roll rate leads yaw rate out of a turn with opposite sign.
c. Sustained non-zero attitudes
   i. Where it is expected that a climb or descent phase of flight will maintain a pitch up or pitch down aircraft orientation for a significant time.

A third embodiment includes a motion lockout mechanism implemented in the GROUND_STATE to take advantage of the fact that tilts and rotations due to cargo handling are a strong indicator that the cargo is not about to be on an aircraft ready for takeoff. Thus, in the event that handling tilts and/or rotations are detected, state transitions out of the GROUND_STATE are prevented for a duration of about two minutes.

Figure 5:
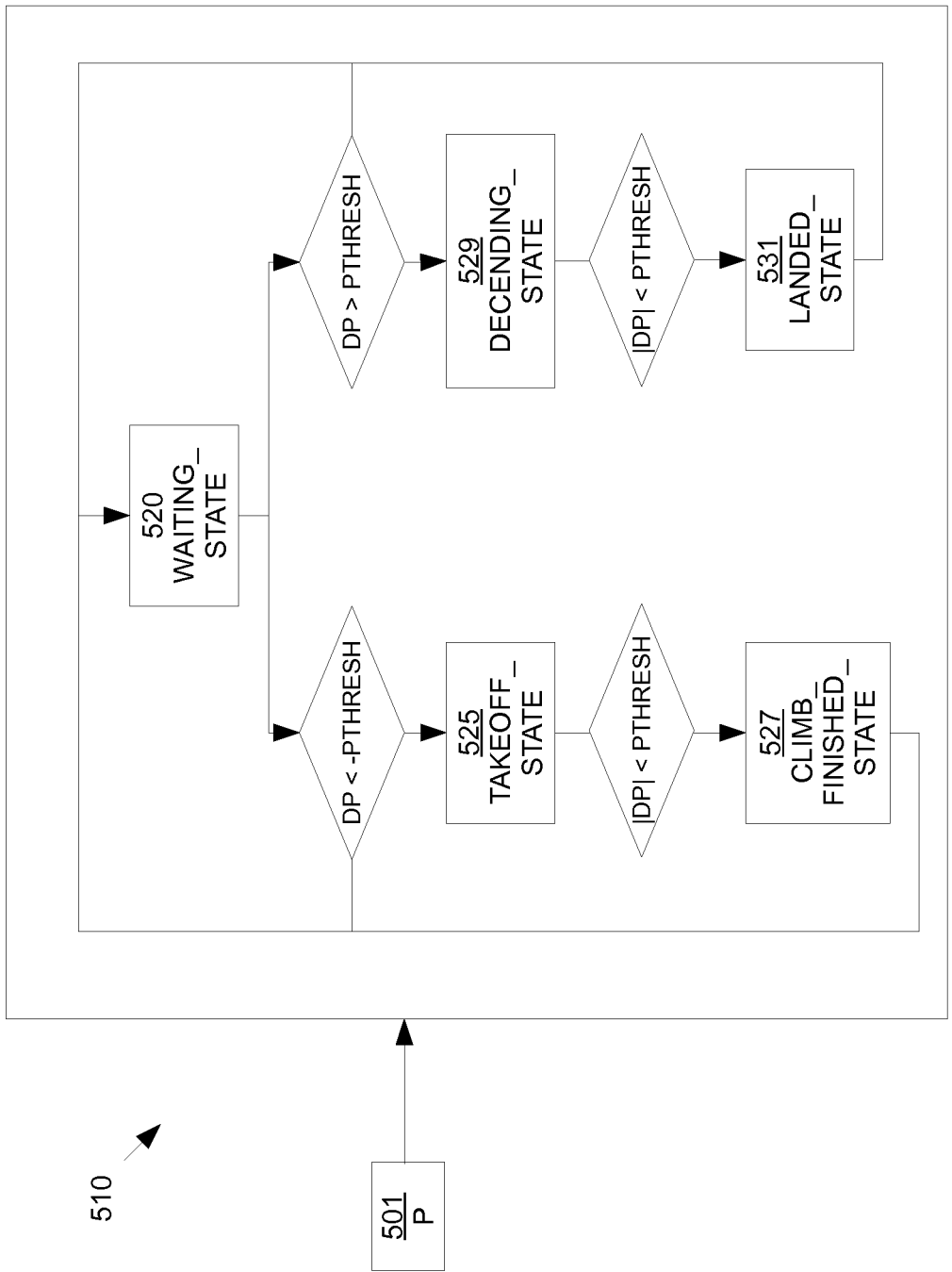
FIG. 5 is a state diagram of a pressure sensing state machine for another embodiment flight status detection system.

A fourth embodiment flight status detection system includes using pressure based confirmation of flight status as shown in FIG. 5. An input from pressure sensor 501 is added for in pressure based decision making An absolute comparison of pressure, and/or a comparison of the pressure derivative against a threshold is used as confirmation of takeoff. The pressure and/or pressure derivative drop below or above a threshold during aircraft events of takeoff climb and landing descent. More specifically, the pressure sensor is configured to sample the pressure at a rate of 1 Hz. This pressure sensor data is used to calculate a time derivative of the pressure which is also low pass filtered over time. An efficient method of simultaneously low pass filtering and calculating the pressure derivative involves taking the pressure data, low pass filtering through two separate low pass filters (each with a different time constant), and then taking the difference between the two. This low pass filtered time derivative pressure signal is then used by the algorithm to detect aircraft climbing just after takeoff, and aircraft descent prior to landing.

The standard algorithm state transitions (i.e. FIG. 2) are then verified by detecting changes in the smoothed time derivative pressure signal. More concretely, a transition from VERIFY_TAKEOFF to FLYING_STATE state as shown in FIG. 2, is verified when the smoothed time derivative pressure signal drops to less than a TAKEOFF_PRESSURE_THRESHOLD. Similarly, a transition from FLYING_STATE to GROUND_STATE is verified when the smoothed time derivative pressure signal becomes greater than a DESCENDING_PRESSURE_THRESHOLD. The embodiment can utilize a state machine specifically for pressure signal processing (FIG. 5) which is separate from the standard algorithm state machine (FIG. 2). In this configuration, the pressure signal processing state machine 510 runs in parallel to the a state machine as described in the first embodiment and shown in FIG. 2.

As shown in FIG. 5, pressure state machine 510 having the states of WAITING_STATE 520, TAKEOFF_STATE 525, CLIMB_FINISHED_STATE 527, DESCENDING_STATE 529, and LANDED_STATE 520. The state machine begins in WAITING_STATE 520. If the smoothed time derivative pressure signal ever has a value below the negative value of threshold PTHRESH, the state will transition to TAKE_OFF_STATE 525 indicating that there is a likelihood that the aircraft is climbing. Similarly, while in WAITING_STATE 520, if the smoothed time derivative pressure signal ever has a value above threshold PTHRESH, the state will transition to DESCENDING_STATE 529 indicating that there is a likelihood that the aircraft is descending.

While in TAKEOFF_STATE 525, if the absolute value of the smoothed time derivative pressure signal ever drops below threshold PTHRESH, the state will change to CLIMB_FINISHED_STATE 527. In CLIMB_FINISHED_

STATE 527 a message indicating the climb has finished may be communicated to other portions of the algorithm, then the state will go back to WAITING_STATE 520. Similarly, while in DESCENDING_STATE 525, if the absolute value of the smoothed time derivative pressure signal ever drops below threshold PTHRESH, the state will change to LANDED_STATE 531. In LANDED_STATE 531 a message indicating the aircraft has landed may be communicated to other portions of the algorithm, then the state will go back to WAITING_STATE 520. The addition of pressure sensor 501 and the analysis of the pressure signal as described allows a secondary means of determining flight status, which may be used as a backup method or as a way of confirming flight state as determined by other methods.

In a fifth embodiment, a failsafe timer is implemented on the flight status detection system. When in flight, the timer is used to detect when a total possible flight time threshold is passed to bring the state machine out FLYING_STATE to ensure failsafe operation for missed landing detections.

In a sixth embodiment, geographic location data is used to implement a geographic fencing. A library of airport locations can be compared against real-time location of the device determined by GPS, cell triangulation, or WiFi. When the system GPS indicates the apparatus is within an airport boundary, the takeoff detection algorithm can be run with more aggressive parameters. For example, higher accelerometer sampling rates may be used, and/or the gyroscope may be turned on instead of waiting for a takeoff acceleration. When the system is not within an airport boundary, it could run in a less aggressive mode, or not at all to save device power and extend battery life.

In a seventh embodiment, the audio signature of a jet or propeller engine could also be detected with a microphone and DSP signal processing to further confirm the device is within an aircraft and should turn its radios off.

In an eighth embodiment, a magnetometer is used to help detect magnetic fields and field signatures in proximity to the cargo. For example, the unique magnetic signature of various aircraft bodies could be detected with a magnetometer and DSP signal processing to further confirm the device is within an aircraft and should turn its radios off.

The disclosed flight status detection system and methods resulted in several advantages and surprising results. The system and method was able to accurately distinguish between aircraft flight events and other transportation movements resulting in a system and method capable of safely shutting down an external radio before flight takeoff and turning the radio back on soon after landing. False radio shutoffs are also minimized with the disclosed system and method. Further, the method and system is capable of operating accurately while using only low sample rates and processing power. This results in significant power savings and allows the system and method to work for extended periods without recharging or new batteries. Additionally, while the disclosed device and method can have a GPS, a GPS is not necessary for accurate functioning. Usage of the method and device without a GPS offers substantial power savings over a device or method which uses a GPS. Most importantly, perhaps, the disclosed method and system offer the benefit a completely self-contained system that does not require external inputs or coordination with other systems. This allows deployment without dependencies on external infrastructure and offers high reliability that is independent of other system failures.

While several embodiments of the flight status detector system has been shown and described, and several modifications thereof discussed, persons skilled in this art will readily appreciate that various additional changes may be made without departing from the spirit of the invention.

The invention claimed is:

1. A low power method for determining whether a cargo destined for air transport is in a flying state comprising the steps of:
   providing a housing for attachment to a cargo, said housing comprising an accelerometer for detecting a linear acceleration, a gyroscope for detecting an angular rate and a controller;
   measuring a linear acceleration with said accelerometer;
   measuring an angular rate with said gyroscope;
   providing said measured linear acceleration and angular rate to said controller; and
   generating a flight status output signal indicating whether said housing is in a flying state as a function of said linear acceleration signal and said angular rate signal.

2. The method as set forth in claim 1, and further comprising the step of shutting off a radio as a function of said flight status output signal.

3. The method as set forth in claim 1, wherein said measured linear acceleration comprises a three independent axis linear acceleration signal and said measured angular rate comprises a three independent axis rotation rate signal.

4. The method as set forth in claim 1, wherein said flight status output signal comprises an in-flight status state and an on-the-ground status state.

5. The method as set forth in claim 4, and further comprising the step of providing a radio turn off signal when said flight status output signal comprises an in-flight status state.

6. The method as set forth in claim 1, wherein said function is a state machine algorithm comprising the steps of filtering said measured linear acceleration to produce a filtered linear acceleration, filtering said measured angular rate to produce a filtered angular rate, and changing a state as a function of said filtered linear acceleration and filtered angular rate.

7. The method as set forth in claim 1, and further comprising the step of powering said gyroscope as a function of said flight status output signal such that said gyroscope is powered off when said flight status output signal comprises an on-the-ground status state and said gyroscope is powered on when said flight status output signal comprises a verify-takeoff status state.

8. The method as set forth in claim 1, wherein said step of generating a flight status output signal comprises the steps of removing a gravitational component of said measured linear acceleration with a high pass filter having a cutoff frequency of about 0.01 Hz and saving said removed gravitational component.

9. The method as set forth in claim 1, wherein said step of generating a flight status output signal further comprises the step of detecting a linear acceleration characteristic of an aircraft takeoff.

10. The method as set forth in claim 9, wherein said linear acceleration characteristic of a takeoff is an acceleration signal with a frequency between 0.01 Hz and 0.1 Hz and a magnitude of between about 0.15 g and 0.5 g maintained for a duration of about two seconds.

11. The method as set forth in claim 9, and further comprising the step of saving a takeoff acceleration of said linear acceleration signal when said linear acceleration characteristic of an aircraft takeoff is detected and wherein said saved takeoff acceleration comprises a windowed average.

12. The method as set forth in claim 9, wherein said step of generating a flight status output signal further comprises the step of changing from an on-the-ground state to a verify-takeoff state when said linear acceleration characteristic of an aircraft takeoff is detected.

13. The method as set forth in claim 11, and further comprising the step of saving a gravitational acceleration component from said linear acceleration signal and wherein said gravitational acceleration is saved from a time period before a transition to a verity-takeoff state.

14. The method as set forth in claim 9, wherein said step of generating a flight status output signal further comprises the step of detecting an angular rate characteristic of an aircraft takeoff.

15. The method as set forth in claim 14, wherein said angular rate characteristic of an aircraft takeoff is an angular rate in which an x-axis angular rate, a y-axis angular rate, and a z-axis angular rate are all less than an angular rate limit threshold.

16. The method as set forth in claim 14, wherein said angular rate is transformed through a rotation, said rotation configured and arranged to reorient said measured angular rate into a yaw rate, a roll rate, and a pitch rate.

17. The method as set forth in claim 16, wherein said rotation is a cross product of said saved gravitational acceleration and said saved takeoff acceleration.

18. The method as set forth in claim 16, and further comprises the steps of integrating said angular rate with respect to time to produce a pitch angle displacement, a yaw angle displacement, and a roll angle displacement and setting said flight status output signal to an on-the-ground state when said pitch angle displacement, yaw angle displacement, or roll angle displacement are greater than an angle displacement threshold.

19. The method as set forth in claim 18, and further comprising the steps of: providing a pressure sensor; detecting when said pressure sensor has a pressure decrease rate less than a takeoff pressure decrease threshold; and detecting when said pressure sensor has a pressure increase rate greater than a landing pressure increase threshold.

20. A system for detecting an aircraft flight status comprising:
an accelerometer for detecting a linear acceleration and having a linear-acceleration output signal;
a gyroscope for detecting an angular rate and having an angular rate output signal; and
a controller configured and arranged to produce a flight status output signal as a function of said linear acceleration output signal and said angular rate output signal, said flight status output signal comprising an in-flight state and second state; and
wherein said accelerometer, gyroscope and controller are in a housing.

21. The system as set forth in claim 20, and wherein said controller is further configured to shut off a radio as a function of said flight status output signal.

22. The system as set forth in claim 20, wherein said linear acceleration output signal comprises a three independent axis linear acceleration signal and said angular rate output signal comprises a three independent axis rotation rate signal.

23. The system as set forth in claim 20, wherein said second state of said flight status output signal comprises an on-the-ground status state.

24. The system set forth in claim 23, wherein said in-flight status state comprises a verify-takeoff status state.

25. The method as set forth in claim 24, wherein said controller is configured and arranged to power off said gyroscope when said flight status output signal comprises said on-the-ground status state and to power on said gyroscope when said flight status output signal comprises said verify-takeoff status state.

26. The system as set forth in claim 20, wherein said function comprises a filter configured and arranged to produce a filtered linear acceleration, and a filter configured and arranged to produce a filtered angular rate.

27. The system as set forth in claim 20, wherein said controller is configured and arranged to remove a gravitational component of said linear acceleration output signal, said system further comprises a high pass filter configured and arranged to remove said gravitational component from said linear acceleration output signal, wherein said high pass filter has a cutoff frequency of about 0.01 Hz, and wherein said controller is configured and arranged to save said removed gravitational component.

28. The system as set forth in claim 20, wherein said controller is configured and arranged to detect a linear acceleration characteristic of an aircraft takeoff.

29. The system as set forth in claim 28, wherein said linear acceleration characteristic of takeoff is an acceleration signal with a frequency between 0.01 Hz and 0.1 Hz and a magnitude of between about 0.15 g and 0.5 g maintained for a duration of about two seconds.

30. The system as set forth in claim 28, wherein said controller is configured and arranged to save said acceleration output signal when a linear acceleration characteristic of an aircraft is detected.

31. The system as set forth in claim 30, wherein said controller is configured and arranged to change said flight status output signal from an on-the-ground state to a verify-takeoff state when said linear acceleration characteristic of an aircraft takeoff is detected.

32. The system as set forth in claim 30, wherein said controller is configured and arranged to save a gravitational acceleration component from said linear acceleration signal and wherein said gravitational acceleration is saved from a time period before a transition to a verify-takeoff state.

33. The system as set forth in claim 30, wherein said controller is configured and arranged to detect an angular rate characteristic of an aircraft takeoff.

34. The system as set forth in claim 33, wherein said angular rate characteristic of an aircraft takeoff is an angular rate in which an x-axis angular rate, a y-axis angular rate, and a z-axis angular rate are all less than an angular rate limit threshold.

35. The system as set forth in claim 33, and further comprising a rotation transformer configured and arranged to transformed said angular rate output signal through a rotation, said rotation configured and arranged to reorient said measured angular rate into a yaw rate, a roll rate, and a pitch rate.

36. The system as set forth in claim 35, wherein said rotation is a cross product of said saved gravitational acceleration and said saved takeoff acceleration.

37. The system as set forth in claim 35, and further comprising an integrator configured and arranged to integrate said angular rate with respect to time to produce a pitch angle displacement, a yaw angle displacement, and a roll angle displacement and wherein said controller is configured and arranged to set said flight status output signal to an on-the-ground state when said pitch angle displacement, yaw angle displacement, or roll angle displacement are greater than an angle displacement threshold.

38. The system as set forth in claim 37, and further comprising a pressure sensor.

39. The system as set forth in claim 38, and wherein said controller is configured and arranged to detect when said pressure sensor has a pressure decrease rate less than a takeoff pressure decrease threshold and to detect when said pressure sensor has a pressure increase rate greater than a landing pressure increase threshold.

* * * * *